US005612116A

United States Patent [19]

Jinno et al.

[11] Patent Number: 5,612,116

[45] Date of Patent: Mar. 18, 1997

[54] DECORATIVE TRANSFER SHEET WITH FOAM BACKING LAYER

[75] Inventors: Chitoshi Jinno, Chigasaki; Hiroyuki Toyohara, Tokyo; Hikaru Mimura, Hadano; Takashi Murohashi, Yokohama, all of Japan

[73] Assignees: Sekisui Kaseihin Kogyo Kabushiki Kaisha, Nara; Nippon Preston Kabushiki Kaisha, Yokohama; Eslen Chemical Co., Ltd., Tokyo, all of Japan

[21] Appl. No.: 614,607

[22] Filed: Mar. 13, 1996

Related U.S. Application Data

[63] Continuation of Ser. No. 265,964, Jun. 27, 1994, abandoned.

[30] Foreign Application Priority Data

Jun. 30, 1993 [JP] Japan .................................... 5-161555

[51] Int. Cl.$^{6}$ ....................................................... B32B 5/16

[52] U.S. Cl. .......................... 428/143; 428/149; 428/150; 428/914; 428/703; 428/213; 428/215; 428/317.1; 428/317.9; 428/318.4; 428/480; 428/332; 52/315; 264/316; 264/112; 264/256; 264/333; 264/131; 156/232; 249/15; 249/115

[58] Field of Search .................................... 428/143, 149, 428/150, 914, 703, 213, 215, 317.1, 317.9, 318.4, 480, 332; 52/315; 264/316, 112, 256, 333, 131; 156/232; 249/15, 115

[56] References Cited

U.S. PATENT DOCUMENTS 4,110,276 8/1978 DesMarais .............................. 521/123
4,146,599 3/1979 Lanzetta .................................... 264/35
4,223,068 9/1980 Carlstrom et al. ........................ 428/310
4,490,485 12/1984 Peterson et al. ........................... 521/48
5,000,991 3/1991 Hayashi et al. ......................... 428/36.5
5,330,694 7/1994 Iwaya ..................................... 264/112

FOREIGN PATENT DOCUMENTS 46-35337 10/1971 Japan .
56-169189 12/1981 Japan .
61-64438 5/1986 Japan .
61-277408 12/1986 Japan .
2299833 12/1990 Japan .

OTHER PUBLICATIONS

Patent Abstracts of Japan; vol. 15, No. 77 (M–1085)—22 Feb. 1991 & JP–A–22 099 833 (Nippon Puresuton KK) 12 Dec. 1990 (Abstract).

Derwent Publications Ltd. (AN 92–403706) & JP–A–4 301 438 (Sekisui Chem. Ind. Co. Ltd) 26 Oct. 1992 (Abstract).

*Primary Examiner*—William Watkins

*Attorney, Agent, or Firm*—Armstrong, Westerman, Hattori, McLeland & Naughton

[57] ABSTRACT

A decorative sheet for construction is disclosed. The decorative sheet for construction comprises a thermoplastic polyester resin foam forming a surface layer, a large number of inorganic aggregates scattered over the surface of the foam in the presence of an adhesive, said inorganic aggregates forming a decorative face layer by the medium of the adhesive, and a backing layer formed on the decorative face layer. The decorative sheet of the present invention enables its decorative face layer with a backing layer to be reliably and readily transferred to the surface of concrete construction or products, and yet which enables a foam layer as a protective layer for the decorative face layer with a backing layer to be readily removed after application. A decorative concrete product for construction using the same, and processes for preparing them are also disclosed.

8 Claims, 2 Drawing Sheets

DECORATIVE TRANSFER SHEET WITH FOAM BACKING LAYER

This application is a Continuation of application Ser. No. 08/265,964, filed Jun. 27, 1994, now abandoned.

BACKGROUND OF THE INVENTION

1. Field of the Invention

The present invention relates to a decorative sheet for construction, a decorative concrete product for construction using the decorative sheet, and processes for preparing them. In particular, it relates to a decorative sheet for construction which enables a decorative layer with a backing layer having a natural stone-like pattern or the like to be transferred to an interior or exterior surface of a construction such as a wall, a gatepost, a fence, a passage, a poolside, a pavement, a curb of a road or of a plot in a park, or a surface of other various types of constructions; a decorative concrete product with such a decorative layer with a backing layer transferred thereto by the use of the decorative sheet; and a processes for preparing them.

2. Related Art Statement

To decorate interior and exterior surfaces of constructions and/or to impart improved water resistance thereto, various surface finishes are generally given to inner and outer walls, and floors of constructions and the like.

For example, in application of inner and outer walls and a floor in a construction site, there has heretofore been conducted such a procedure by a skilled artisan that a mixture of a concrete or mortar with an aggregate is prepared in situ and applied, and thereafter, the surface of the resultant is subjected to so-called scrubbed finish by partially scrubbing it off with water or so-called scraped finish by partially scraping it off with a wire brush, or coated with a coating, or tiled. Alternatively, in a case of a construction of large scale, surface-decorated large-sized interior or exterior concrete products such as precast concrete panels or precast concrete blocks are preliminarily manufactured in a factory, and transported into a construction site and constructed there into inner or outer walls and the like.

By the various types of surface finish, aesthetic appearance and solid-looking are imparted to constructions and/or practically desired durability, water resistance and the like are effectively attained. In such various types of finish, in particular scrubbed finish, scraped finish and the like, however, technical skills of skilled artisans are required, and yet it is difficult to attain appearance with just intended pattern and/or color. Further, such finishing operations are likely, from the nature thereof, to be prevented from being carried out in rainy days, i.e., these finishing operations have great problem of susceptibility to weather.

To solve these disadvantages inherent in such finishing operations on constructions, a number of attempts have been proposed.

Japanese Unexamined Utility Model Publication No.64438/1986 discloses a decorative sheet for construction which comprises a resin sheet, an adhesive layer formed on one side of the resin sheet, and aggregates such as sand, gravel or the like deposited over the adhesive layer. According to the reference, concrete is applied onto a construction body, and while the concrete is yet unhardened, the decorative sheet for construction is uniformly pressed against the concrete in such a manner that the side of the decorative sheet on which aggregates such as sand or gravel are deposited is in contact with the concrete, and after completion of hardening of the concrete, the resin sheet is peeled off to thereby transfer the decorative layer comprising an adhesive and aggregates such as sand or gravel onto the surface of the construction.

However, when such a decorative sheet for construction is used, since the aggregates are likely to be insufficiently bonded to each other via the adhesive, detachment of the aggregates tends to occur after the removal of the resin sheet. Accordingly, durability is liable to be poor. In the reference, there is also disclosed an embodiment aiming at improving durability, in which after the deposition of the aggregates such as sand or gravel over the adhesive, a coating film is formed thereon by spraying a resin, glue or the like to strengthen the bonding between the aggregates. It is, however, confirmed that because of poor penetration of the resin or glue into fine voids between the aggregates, such a coating film formed only therefrom cannot sufficiently strengthen the bonding between the aggregates. Further, adhesion between the concrete and the resin or glue is likely to be poor, and hence there occurs a phenomenon that the decorative layer transferred is peeled from the concrete at the time of the removal of the resin sheet. In addition, when a paper sheet is used instead of the resin sheet, the paper sheet is liable to be broken during its removal to partially remain unreleased. Accordingly, smooth release of the paper sheet is hardly expected.

Japanese Unexamined Patent Publication No.277408/1986 discloses a method which comprises forming an adhesive layer on one side of a paper sheet, depositing aggregates such as sand or gravel on the adhesive layer, pressing the resulting sheet against concrete applied as a body of a construction while the concrete is still unhardened in such a manner that the surface on which the aggregates such as sand or gravel are deposited is in contact with the concrete, and removing the paper sheet after completion of hardening of the concrete to fixedly transfer the aggregates such as sand or gravel to the surface of the concrete. Also in this method, the aggregates are incompletely bonded by the adhesive and accordingly liable to detach, thereby leading to poor durability. Further, as specific methods for removing the paper sheet, washing off with water, burning off, abrasion and the like are mentioned. For example, however, water running from upper potion to the lower portion in the method of washing off with water, and use of fire device in the method of burning off make cumbersome limitations in construction, thereby inevitably leading to poor constructional efficiency and increased cost.

To solve the above-mentioned problems, the present inventors have made intensive and extensive studies, and as a result, they have developed a decorative sheet for construction which comprises a resin film, preferably a polypropylene film; a layer formed thereon as a decorative face layer including inorganic aggregates and an additive; and a backing layer formed on the decorative face layer, and they have already filed a patent application relating thereto (Japanese Unexamined Patent Publication No.299833/1990). In this decorative sheet for construction, the backing layer is formed on the resin layer as a decorative face layer including inorganic aggregates to cause to penetrate into fine voids between the inorganic aggregates, thereby further strengthening the bonding between the aggregates.

However, it has disadvantageously often occurred that during transportation of the decorative sheet for construction to a construction site to carry out the application, the polypropylene film and a portion of the decorative face layer unexpectedly separate from each other. Further, it has been found that since an unexpanded one is used as the polypropylene film, the surface thereof is likely to be damaged when a member having an acute tip abuts upon the surface. It has further been found that in the case where a polystyrene film is used instead of the polypropylene film, although separation during transportation does not occur, if removal of the surface polystyrene film is conducted without close attention after application at a predetermined position and transfer of the decorative face layer to a placed concrete, the film is broken and hardly removed in part.

Further, it has been confirmed that in producing a decorative concrete product such as a decorative concrete panel, if the surface film is made of a polypropylene or polystyrene, the surface film may undergo deformation due to contraction by generated heat, thereby disadvantageously causing a partially incomplete transfer of the decorative face layer.

SUMMARY OF THE INVENTION

The present invention has been made in view of the above-mentioned situation. It is an object of the present invention to provide a decorative sheet for construction which is capable of solving the above-mentioned problems, which enables a decorative face layer with a backing layer to be reliably and readily transferred to the surface of concrete construction or products, and yet which enables a foam layer as a protective layer for the decorative face layer to be readily removed after application.

It is another object of the present invention to provide, by using such a decorative sheet for construction, a decorative concrete product for construction which is capable of giving a person aesthetic appearance and solid-looking and/or capable of effectively imparting practically desired durability, water resistance and the like.

It is still another object of the present invention to provide a process for preparing the decorative sheet for construction.

It is further object of the present invention to provide a process for preparing the decorative concrete product for construction by using the decorative sheet for construction.

The present inventors have made intensive and extensive studies to solve the above-mentioned problems, and as a result, they have found that overcoming the liability of separation between the surface layer and the decorative face layer during transportation and the like and easy and reliable removal of the surface layer from the decorative face layer at the time of need after application to the surface of concrete can be attained by using a thermoplastic polyester resin foam having excellent heat resistance and buffering properties as a surface layer, scattering a large number of inorganic aggregates over the surface of the foam by the medium of an adhesive to form a decorative face layer, and applying a backing layer onto the decorative face layer.

Therefore, the present invention basically resides in a decorative sheet for construction comprising:

a thermoplastic polyester resin foam forming a surface layer, a large number of inorganic aggregates scattered over the surface of the foam in the presence of an adhesive, said inorganic aggregates forming a decorative face layer by the medium of the adhesive, and a backing layer formed on the decorative face layer; and in a process for preparing a decorative sheet for construction, said process comprising steps of:

(a) applying an adhesive onto a thermoplastic polyester resin foam, (b) scattering a large number of inorganic aggregates over the adhesive-applied foam in advance of setting of the adhesive to form a decorative face layer, said inorganic aggregates having different sizes if desired, (c) applying a backing layer onto the decorative face layer, and (d) drying the backing layer-coated resultant.

In a preferred embodiment, a step(d') of studded inorganic aggregates over the surface of the backing layer in advance of setting of the backing layer is interposed between the step(c) and the step(d).

The present invention further resides in a decorative concrete product for construction comprising:

a concrete body, and a decorative face layer with a backing layer of a decorative sheet for construction according to claim 1, said decorative face layer with a backing layer being transferred to a surface of the concrete body; and in a process for preparing a decorative concrete product for construction, said process comprising steps of:

(a) applying an adhesive onto a thermoplastic polyester resin foam, (b) scattering a large number of inorganic aggregates over the adhesive-applied foam in advance of setting of the adhesive to form a decorative face layer, said inorganic aggregates having different sizes if desired, (c) applying a backing layer onto the decorative face layer, and (d) drying the backing layer-coated resultant (e) placing the thus prepared decorative sheet for construction into a formwork, and (f) pouring a concrete or mortar into the sheet-placed formwork to effect curing and hardening, followed by releasing the resulting product from the formwork.

In a preferred embodiment, a step(d') of studding inorganic aggregates over the surface of the backing layer in advance of setting of the backing layer is interposed between the step(c) and the step (d).

DETAILED DESCRIPTION OF THE PREFERRED EMBODIMENTS

Figure 1A:
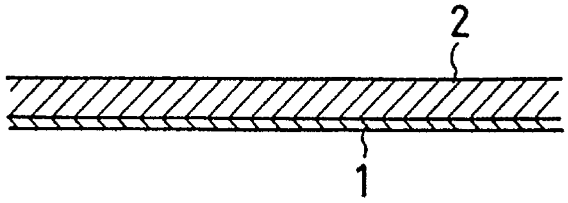
FIG. 1(*a*), FIG. 1(*b*), FIG. 1(*c*), FIG. 1(*d*), FIG. 1(*e*), and FIG. 1(*f*) are schemes illustrating one mode of the procedure for preparing a decorative sheet of the present invention, in which FIG. 1(*f*) shows diagrammatic cross-section of a preferred form of the decorative sheet for construction of the present invention, and in which reference number 1 represents a thermoplastic polyester resin foam, reference number 2 represents an adhesive, reference number 3 represents inorganic aggregates, reference number 4 represents a backing layer, and reference number 5 represents inorganic aggregates.

The present invention basically discloses a decorative sheet for construction comprising a thermoplastic polyester resin foam forming a surface layer 1, a large number of inorganic aggregates 3 scattered over the surface of the foam 1 in the presence of an adhesive 2 as a medium to form a decorative face layer, and a backing layer 4 formed on the decorative face layer.

It is preferred that the thermoplastic polyester resin foam be a foam sheet. It is also preferred to deposit inorganic aggregates over the backing layer.

It is yet preferred to use a foam sheet having a thickness of about 0.5 mm to about 5 mm as the thermoplastic polyester foam forming the surface layer. If the foam sheet has a thickness less than about 0.5 mm, surface protection of a concrete panel or the like can be unsatisfactory during transportation, constructing operation and the like. On the other hand, a thickness of about 5 mm of the foam sheet is capable of providing sufficient surface protection, and yet if used in a surface decorating material for a constructional member having a curved surface, the thickness preferably allows the surface decorating material to easily conform to the shape of the constructional member.

In the decorative sheet for construction of this type, the temperature is sometimes elevated to about 200° C. due to the heat generated in the course of the curing from placing on the backlayer to completion of hardening. Therefore, the material of the resin sheet as the surface layer is required to be a material which does not undergo deformation nor contraction by such a temperature increase. According to the experiments by the present inventors, it is suitable for satisfying such a requirement to use a thermoplastic polyester resin foam. As the thermoplastic polyester resin foam, there may be mentioned a foam of a polyethylene terephthalate, polybutylene terephthalate, polyethylene naphthalate, polybutylene terephthalate elastomer, or polycyclohexane terephthalate. Of these, a form of a polyethylene terephthalate or polyethylene naphthalate is particularly preferred. These resins may be foamed alone or in combination to obtain a suitable foam. Further, there may be used a foam using a modified resin containing one of these resins or a mixture thereof in an amount of 50% by weight or more. Furthermore, these foams with its crystallinity increased to improve heat resistance may extremely preferably be used. Specifically, a foam with its crystallinity increased to 5% or more is preferred. To obtain a heat resistance to a temperature of about 200° C., crystallinity increased to about 18% or more is preferred with respect to a polyethylene terephthalate resin foam.

To protect the decorative face layer till completion of transportation and constructing operation, excellent buffering properties are required. It is preferred for attaining satisfactory buffering properties that the foam have a specific gravity of about 0.1 to about 0.6. As such a foam having excellent heat resistance and buffering properties, there may preferably used a thermoplastic polyester resin foam obtained in accordance with the technical method disclosed in U.S. Pat. No. 5,000,991 or the like.

According to the experiments of the present inventors, it has been found that only in the case where a thermoplastic polyester resin foam is used as the surface layer, a decorative sheet for construction is obtained which has excellent adhesion between the foam and a decorative face layer and hence does not easily undergo separation between them, and yet the foam can readily be removed after completion of application to concrete or the like and curing of the concrete or the like, i.e., it has been found that the requirements seemingly conflict with each other are satisfied. The reason for this has not yet clearly been understood.

It has been found that if a polystyrene resin foam sheet is used as the surface layer, although a decorative sheet for construction is obtained which has excellent adhesion between the foam sheet and a decorative face layer and hence does not easily undergo separation between them, the foam sheet cannot readily be removed after completion of application to concrete or the like and curing the concrete or the like. In addition, the foam sheet may be contracted or partially melted by heat generated in the course of the curing of the concrete to undergo deformation. In such a case, the decorative face layer with a backing layer cannot be transferred to the placed concrete satisfactorily. When an foam sheet of a polyethylene resin, polypropylene resin or polyvinyl chloride resin is used in a decorative sheet for construction, the foam sheet may partially or entirely be peeled off during transportation before application, and the foam sheet may undesirably undergo partial deformation by heat generated in the course of curing after the application.

The backing layer is applied with a view to strengthening the bonding between the inorganic aggregates, to improving the adhesion to concrete, and to reinforcing the decorative sheet. As a material for forming the backing layer, there may preferably be used one member selected from the group consisting of a cement admixture resin, a soft cement and a resilient mortar. The backing layer formed of such a material is capable of penetrating into fine voids between the inorganic aggregates, and hence enables pin-holes which are likely to form between the aggregates to be prevented from forming, the binding between the aggregates to be reinforced, and adhesion to the concrete or mortar placed to be improved. Further, when a cement admixture resilient resin is appropriately mixed in the backing layer, appropriate elasticity is imparted to the backing layer, and consequently, the decorative sheet is enabled to have preferable flexibility. Accordingly, it is possible to prevent the decorative sheet form being broken or damaged during transportation or application. Further, since the decorative sheet is reinforced, and easily conformable to finishing of curved surface. Further, it is preferred to appropriately incorporate a colorant into the backing layer, thereby rendering the appearance of the decorative face layer fine and dense to that of a natural stone. The backing layer is applied in an amount of about 500–1,500 g/m$^2$, preferably about 1,000–1,200 g/m$^2$.

The inorganic aggregates, which are interposed between the surface layer that is thermoplastic polyester resin foam and the backing layer, are provided for the purpose of decoration. There are no particular restrictions with respect to the material and size thereof. However, fragments of a natural stone or ceramics are suitable for obtaining a good decorative pattern. As the natural stone, granite, marble, and kansui-seki are preferred. Of these, granite and marble are particularly preferred because of their low water absorption. When several groups of the inorganic aggregates having different sizes are used, it is preferred to portion-wise scatter the inorganic aggregates in several times in large-to-small order of size. By this preferable mode, there is attained effect that a decorative concrete panel, a decorative concrete wall, a decorative concrete floor and the like which have a decorative face still further densely similar to a natural stone can be obtained.

The inorganic aggregates studded over the backing layer are employed with a view to further improving the adhesion to the concrete placed. As a material thereof, fragments of a natural stone or ceramics are preferred. According to the experiments by the present inventors, fragments of a natural stone are found to be particularly preferred. The inorganic aggregates preferably have a size of about 0.8 mm to about 1.2 mm. According to the experiments, it was found that the adhesion to the placed concrete is lowered when the aggregates have a size smaller or larger than the above-mentioned range.

The adhesive used is appropriately selected depending upon the thickness of the thermoplastic polyester resin foam forming the surface layer, the material and thickness of the backing layer, and the like. The adhesive may be an acrylic, polyester, epoxy, urethane or fluororesin adhesive or the like. Of these, desired are alkali-resistant adhesives which are hardly susceptible to alkalinity inherent in concrete or adhesives having excellent weather resistance as the surface material of the decorative face layer. The adhesive preferably has a high viscosity. The viscosity is preferably about 3,000 to about 15,000 poise. The adhesive is applied in an amount of 200 to 500 g/m$^2$, preferably 250 to 350 g/m$^2$. According to the experiments by the present inventors, when the amount is less than 200 g/m$^2$ or the viscosity is lower than about 3,000 poise, such results are caused that pin-holes are likely to occur and stone-like pattern is not successfully obtained.

The size of the decorative sheet for construction according to the present invention may be selected freely. For example, however, a size of about 600×1,000 mm is preferred. Further, the foam may be planar, or for example, it may have such a surface configuration that a plurality of concave and convex portions alternating at predetermined intervals are formed in longitudinal and transverse directions. When the former is employed, a decorated outer surface which is smoothly finished is obtained upon removal of the resin foam after transfer of the decorative face layer with a backing layer. On the other hand, when the latter is employed, a decorated outer surface having, for example, tile-applied appearance is obtained upon removal of the resin foam after transfer of the decorative layer with a backing layer.

The present invention also discloses decorative concrete products for construction having any forms of the above-mentioned decorative sheet for construction as decorative face layers with a backing layer. Production of the decorative concrete products is generally conducted in a factory. In production of the decorative concrete product, the decorative sheet for construction is placed into a formwork with its foam sheet positioned outermost, and thereon, mortar or concrete is preferably poured. It is preferred, as means for preventing formation of voids from occurring in the poured concrete and for carrying out pouring operation uniformly in every part in a shorter period of time, to appropriately vibrating the entire formwork by means of a vibrator, ultrasonic generator or the like or to directly vibrating the poured concrete during the pouring of the concrete. These are particularly effective in the case where a decorative sheet for construction is used which has such a surface configuration that a plurality of concave and convex portions alternating at predetermined intervals are formed in longitudinal and transverse directions.

In the decorative concrete product for construction using the decorative sheet for construction according to the present invention, the foam is positioned at its surface. Accordingly, the decorative face layer is protected from damage or stain during transportation or application. Further, the foam forming the surface layer can readily and unfailingly be removed. Consequently, a decorative concrete product for construction can be obtained which is capable of giving a person aesthetic appearance with no defect and solid-looking after application and/or capable of effectively imparting practically desired durability, water resistance and the like, and which enables an interior or exterior surface of a construction such as a wall, a gatepost, a fence, a passage, a poolside, a pavement, a curb of a road or of a plot in a park, or a surface of other various types of constructions to be provided with a natural stone pattern or the like.

TEST EXAMPLES

Figure 1B:
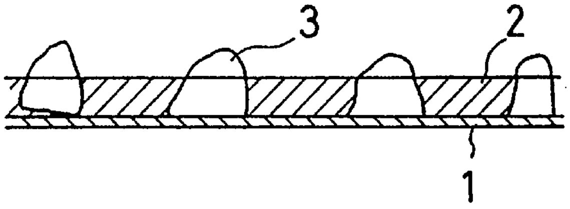
Figure 1C:
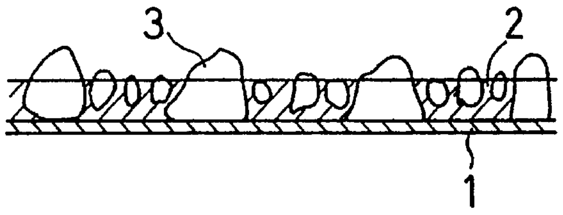
Figure 1D:
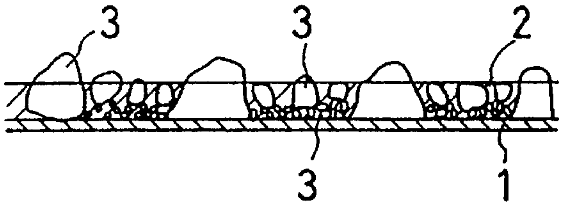
Figure 1E:
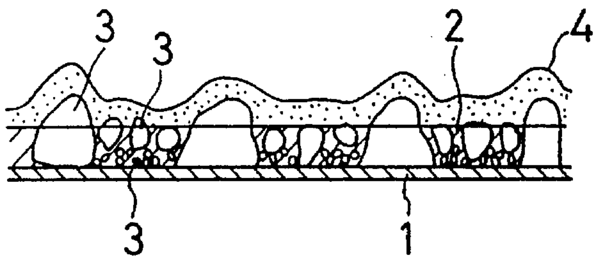
Figure 1F:
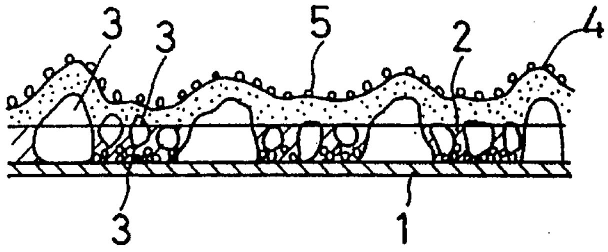
Figure 2:
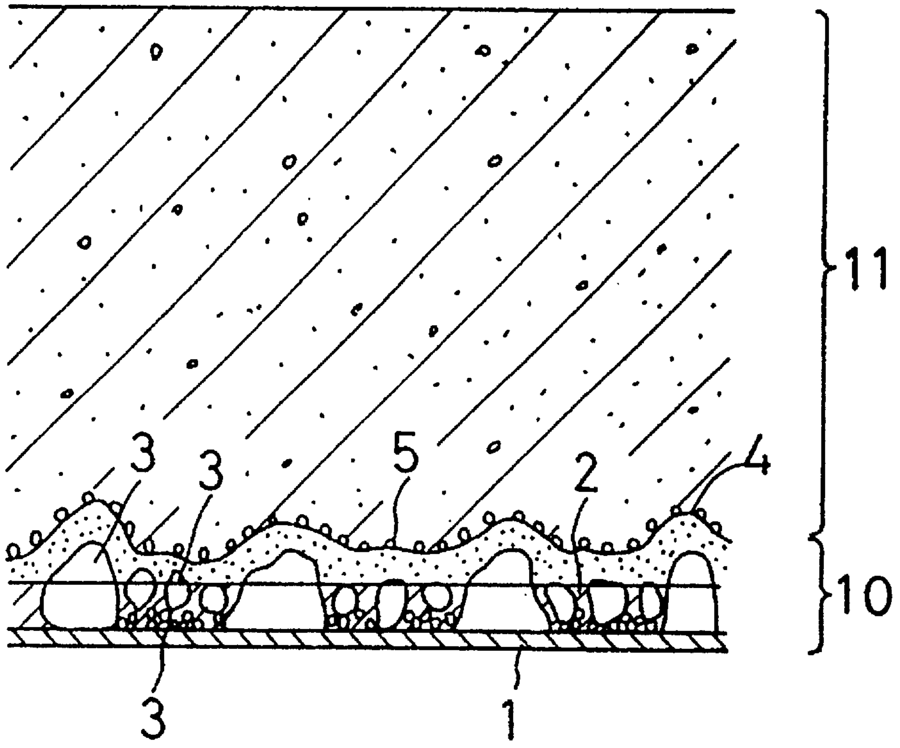
FIG. 2 is a diagrammatic sectional view of a precast concrete panel prepared using a decorative sheet for construction of the present invention.

Now, one embodiment of the process for preparing a decorative sheet for construction according to the present invention will be described in procedual order with reference to FIG. 1(*a*) through FIG. 1(*f*). As shown in FIG. 1(*a*), onto a thermoplastic polyester resin foam 1 having a required thickness is applied an adhesive 2 predetermined tacking adhesion to an inorganic aggregates 3 to be used into consideration. Then, as shown in FIG. 1(*b*) to FIG. 1(*d*), the inorganic aggregates having different sizes are scattered over the adhesive 2 in advance of setting of the adhesive. Preferably, three groups of the inorganic aggregates having average sizes, for example, 5 mm, 3 mm and 1 mm are prepared, and scattered in large-to-small order of size, thereby avoiding disadvantage that large-sized aggregates are not present on or in the vicinity of the back surface of the foam 1. For example, when a decorative precast concrete for construction is applied as an exterior material, inorganic aggregates 3 having different sizes are finely arranged on its surface to provide aesthetically excellent finish.

Then, as shown in FIG. 1(*e*), a backing material is applied to form a backing layer 4. As shown in FIG. 1(*f*), aggregates 5 which are preferably fragments of a natural stone are studded over the surface of the backing layer 4 in advance of setting of the backing layer 4, followed by drying to obtain a decorative sheet for construction according to the present invention.

If desired, the thus obtained decorative sheet for construction is placed into a concrete formwork, and then concrete is poured into the formwork to effect curing and hardening, thereby obtaining a decorative concrete product for construction. The thus obtained decorative concrete product is transported into a construction site and subjected to necessary assembling. After the assembling, the foam sheet is not removed but allowed to stay till completion of the whole construction operation to protect the face layer. It is also possible that a decorative sheet for construction per se is transported into a construction site, the decorative sheet is placed into a formwork which has been assembled here to effect application of a wall surface, and that concrete is poured over a floor base, and a decorative sheet transported into a construction site is uniformly pressed against the concrete to effect application of a floor surface. Also in these cases, the thermoplastic polyester resin foam forming a surface layer should be allowed to stay after curing and hardening of the concrete or mortar concrete to protect face layer until removal is needed.

As described above, since the foam for protection of the face layer is present, the decorative face layer can be surely prevented from being damaged during transportation and application of the decorative concrete product. Thus, a beautiful decoratively patterned surface having a stone-like pattern densely similar to a natural stone can be obtained by removing the foam at the time of necessity after the application. In particular, in the decorative sheet for construction according to the present invention, since the surface layer is formed of a thermoplastic polyester resin foam, removal of the surface layer after the application is readily and reliably carried out, thereby leading to greatly improved operational efficiency.

In the following, Test Examples will be described.

Test Example 1

A polyethylene terephthalate resin foam sheet of 600×1,000 mm (thickness: 1.5 mm, specificgravity: about 0.1, crystallinity: about 20%, trademark: CELLPET, manufactured by Sekisui Kaseihin Kogyo Kabushiki Kaisha) was prepared. Onto this sheet, a soap-free type acrylic resin (AD-1, manufactured by Kanebo, Ltd.) whose viscosity is about 10,000 poise was applied as an adhesive in an amount of 300 g/m$^2$.

Then, groups of fragments of a natural stone having average sizes of 5.0 mm(A), 3.0 mm(B) and 1.0 mm(C) were prepared as inorganic aggregates, and 900 g/m$^2$ of (A) was first, 800 g/m$^2$ of (B) was second, and 300 g/m$^2$ of (C) was third scattered over the adhesive-applied foam in advance of setting of the adhesive. The resultant was dried in a hot air at 60° C. for 60 min.

Then, as a backing layer, a mixture was applied thereon in an amount of 1200 g/m$^2$, which were prepared by mixing a cement type powder comprising 50 parts by weight of a white cement, 50 parts by weight of powdery fragments of a stone, and an additional pigment with a cement admixture resin emulsion (cationic alikali-setting type) at a weight ratio of 40/17. Then, fragments of a granite having an average size of 1.0 mm were studded over the backing layer in an amount of 400 g/m$^2$. The resultant was dried in a hot air at 60° C. for 120 min. to obtain a decorative sheet according to the present invention.

In a factory, the decorative sheet for construction was placed into a formwork (not shown) with its foam sheet 1 positioned outermost, and mortar concrete was poured thereon. During the pouring of the mortar concrete, a rod-like vibrator was inserted in the mortar concrete to vibrate the mortar concrete. Repeating this operation, the formwork was finally filled with mortar concrete. After completion of curing and hardening, the release from the formwork was conducted to obtain a decorative precast concrete panel was obtained. The temperature was elevated to about 150° C. by the heat generated in the course of the curing. However, the foam sheet underwent no contraction and melting at all. The decorative precast concrete panel was in situ assembled as an interior wall, and then the foam sheet was removed. The removal was conducted with ease to obtain the interior wall having decorated face with fine stone-like pattern and with no defect.

Test Example 2

The same adhesive as in Test Example 1 was applied on the same foam sheet as in Test Example 1, except that a color mica (average size: 3 to 5 mm) was mixed in the adhesive.

Then, groups of fragments of a natural stone having average sizes of 3.0 mm(B) and 1.0 mm(C) were prepared as as an inorganic aggregates, 800 g/m$^2$ of (B) was first and 300 g/m$^2$ of (c) was next scattered over the adhesive-applied foam sheet in advance of setting of the adhesive.

Thereafter, a decorative sheet was completed in the same manner as in Test Example 1.

Using the decorative sheet, a decorative precast concrete panel was obtained in the same manner as in Test Example 1. The decorative precast concrete panel was in situ applied as a floor material, and then the foam sheet was removed. The removal was conducted with ease to obtain the floor having decorated face with fine broken stone-like pattern and with no defect.

What is claimed is:

1. A decorative sheet for construction comprising: a thermoplastic polyester resin foam selected from the group consisting of polyethylene terephthalate, polybutylene terephthalate, polyethylene naphthalate, polybutylene terephthalate elastomer and polycyclohexane terephthalate or combinations thereof, forming a surface layer, a large number of inorganic aggregates scattered over the surface of the foam in the presence of an adhesive medium, said inorganic aggregates forming a decorative face layer by the medium of the adhesive, and a backing layer formed on the decorative face layer.

2. The decorative sheet for construction according to claim 1, wherein the thermoplastic polyester resin foam forming a surface layer is a foam of a polyethylene terephthalate or polyethylene naphthalate.

3. The decorative sheet for construction according to claim 1, wherein the thermoplastic polyester resin foam forming a surface layer is a foam sheet having a thickness of about 0.5 mm to about 5 mm.

4. The decorative sheet for construction according to claim 1, further comprising inorganic aggregates studded over the backing layer.

5. The decorative sheet for construction according to claim 1, wherein a large number of the inorganic aggregates scattered between the surface layer and the backing layer are fragments of a natural stone or ceramics.

6. The decorative sheet for construction according to claim 1, wherein a large number of the inorganic aggregates scattered between the surface layer and the backing layer are a mixture of aggregates having different sizes.

7. The decorative sheet for construction according to claim 1, wherein the backing layer is formed of a material selected from the group consisting of a cement admixture resin, a soft cement mortar and a resilient mortar.

8. The decorative sheet for construction according to claim 4, wherein the inorganic aggregates deposited over the backing layer have an average diametral size of about 0.8 mm to about 1.2 mm.

* * * * *